United States Patent [19]

Albrecht

[11] 4,308,305
[45] Dec. 29, 1981

[54] CORE STEEL REINFORCEMENT FOR WINDOW GUIDE CHANNELS AND THE LIKE

[76] Inventor: Helmut Albrecht, 4954 Nettelton Rd., Medina, Ohio 44256

[21] Appl. No.: 167,109

[22] Filed: Jul. 9, 1980

[51] Int. Cl.³ .................. B32B 3/10; E05D 15/16; E06B 7/16
[52] U.S. Cl. .................. 428/134; 428/180; 428/182; 49/440; 49/441; 49/479; 49/488
[58] Field of Search ............... 428/134, 156, 180, 182; 49/440, 441, 479, 488; D25/88; D8/389

[56] References Cited

U.S. PATENT DOCUMENTS 1,435,039  11/1922  Woodward ................ 49/441 X
2,102,936  12/1937  Bailey ...................... 428/182 X
2,407,671  9/1946   Mesnel ..................... 49/479 X
2,728,982  1/1956   Merrill ..................... 49/479 X Primary Examiner—Roland E. Martin, Jr.

[57] ABSTRACT

A core steel reinforcement for window guide channels or the like is disclosed made from thin strip steel and having high strength and rigidity. It has marginal portions or areas in the shape of corrugations of inverted substantially V-shaped cross-section, and a longitudinal median portion or central carrier formed to provide spaced elevations or embossments alternating with indentations or embossments, which aid in the bending or forming of the strip to curvatures both longitudinally and transversely required to conform to those at the corners of automobile windows and the like.

1 Claim, 6 Drawing Figures

CORE STEEL REINFORCEMENT FOR WINDOW GUIDE CHANNELS AND THE LIKE

BACKGROUND OF THE INVENTION

Window guide channels, variously known as window channels, window glass channels, glass run channels, glass runs, guide-ways for sliding windows and window guides, are disclosed in McKinney U.S. Pat. No. 1,876,519; Bailey U.S. Pat. No. 1,903,541; Reid U.S. Pat. No. 1,967,514; Reid U.S. Pat. No. 2,041,956; Hoffman U.S. Pat. No. 2,058,793; Cameron U.S. Pat. No. 2,399,204; Mesnel U.S. Pat. No. 2,407,671; Bascom U.S. Pat. No. 2,412,796; Anderson U.S. Pat. No. 2,474,409; McKinney U.S. Pat. No. 2,635,915; Merrill U.S. Pat. No. 2,728,982 and Bright U.S. Pat. No. 2,933,342.

Such guide channels usually comprise a sheet metal core of sufficient rigidity for proper lateral support of the window received thereby and a flexible covering of woven fabric, rubber, plastic or other suitable material for said core.

In the Merrill patent for example, a sheet metal strip is disclosed having spaced elongated transverse indentations formed in the strip which extends from the edges of the strip toward the center at right angles to the edges and having slits intermediate the indentations and parallel thereto, to thereby provide tongues between the slits, the tongues containing the indentations.

The indentations do not extend across the central or median area of the strip, so that when the strip is bent or formed into channel-shaped form to provide a core reinforcement for the guide channel, the indentations add little or nothing to the strength or rigidity of the core.

Moreover, the fact that the tongues are in direct abutment with each other at the slits, prevents the strip from being bent or curved longitudinally to accommodate the strip to curvatures at the window corners.

SUMMARY OF THE INVENTION

The present invention has as its primary object the provision of core steel reinforcement for window guide channels and the like, which can be formed or bent longitudinally as well as transversely, without difficulty and which in its formed or bent condition, conforms easily to curvatures at window corners.

Another object of the invention is to provide a core steel reinforcement of the character described, which in bent or formed condition, retains high strength and rigidity.

Another object of the invention is to provide a core steel reinforcement or reinforcement strip of the character described, which is formed from thin sheet steel, and which is characterized by marginal portions or areas in the shape of spaced corrugations of inverted substantially V-shaped cross-section.

A further object of the invention is to provide a core steel reinforcement or reinforcement strip of the character described, and which is characterized by a longitudinal median portion or center carrier area which is formed to provide longitudinally-spaced portions of curved cross-section which add to the strength and rigidity of the strip.

Other objects and advantages of the invention will appear in the course of the following description of a preferred embodiment of the invention, wherein like numerals are used to designate like parts.

BRIEF DESCRIPTION OF THE DRAWING

A presently preferred embodiment of the invention will now be described in connection with the drawings, in which.

DESCRIPTION OF THE PREFERRED EMBODIMENT

Referring more particularly to the drawings, a core steel reinforcement or strip is shown in its completed form, prior to being formed or bent into shape to provide a reinforcement for window guide channels or the like.

The core steel reinforcement is made from strip steel, preferably 0.010" in thickness.

Figure 1:
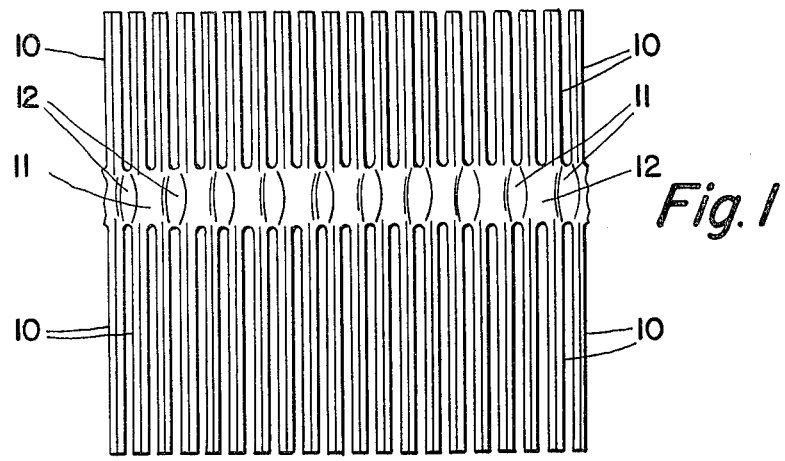
FIG. 1 is a fragmentary top plan view of a core steel reinforcement or strip embodying the invention.
Figure 2:
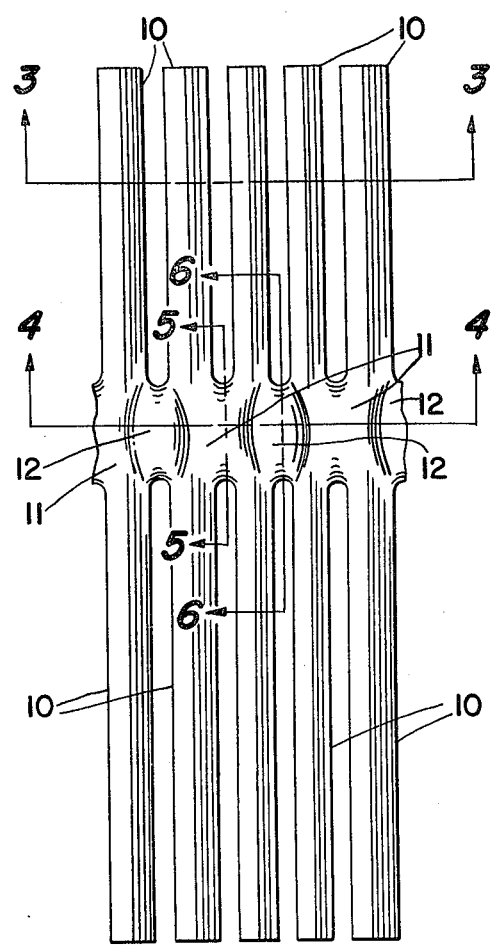
FIG. 2 is a view of a portion of FIG. 1 on an enlarged scale.
Figure 3:
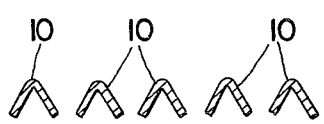
FIG. 3 is a fragmentary cross-sectional view taken on the line 3—3 of FIG. 2.
Figure 4:
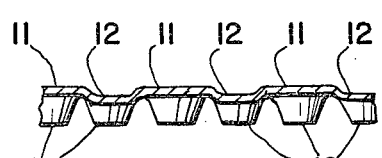
FIG. 4 is a fragmentary cross-sectional view taken on the line 4—4 of FIG. 2.

The strip is slitted transversely along its marginal portions and the areas of the strip between the slits are formed to provide longitudinally-uniformly and spaced corrugations 10 of inverted substantially V-shaped cross-section, as best seen in FIG. 3. These corrugations are 0.010" in depth and the centerline of each corrugation is spaced from the centerline of adjacent corrugations by a distance of 0.083".

The corrugations at one side of the strip are in axial alignment with those at the other side of the strip.

The area of the strip between the corrugations at one side of the strip and the other side of the strip and which may be termed the central or median area of the strip, is formed to provide elevations or embossments 11, and indentations or depressions 12, which alternate with the elevations or embossments 11.

Figure 5:
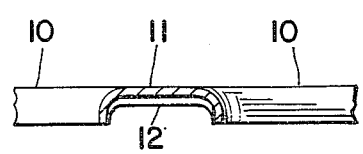
FIG. 5 is a fragmentary cross-sectional view taken on the line 5—5 of FIG. 2.

The elevations or embossments 11 are substantially in alignment with the spaces between the corrugations 11 and the upper surfaces of these elevations or embossments are substantially coplanar with the upper ends of the corrugations 10 as best seen in FIG. 5.

Figure 6:
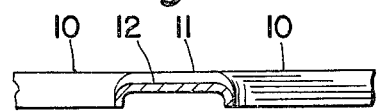
FIG. 6 is a fragmentary cross-sectional view taken on the line 6—6 of FIG. 2.

The indentations or depressions 12 are substantially in alignment with the corrugations 10 and the upper surfaces of these indentations or depressions are substantially parallel with the upper ends of the corrugations 10, as best seen in FIG. 6.

The elevations or embossments 11 and indentations or depressions 12 not only add greatly to the strength and rigidity of the core steel reinforcement, but function also to aid in the bending or forming of the strip to curvatures, both longitudinally and transversely required to conform to those at the corners of automobile windows and the like.

Moreover, in actual practice, it has been found that a core steel reinforcement embodying this invention achieves the same strength with only one-half the weight of steel (ratio of 0.010" to 0.021") as the weight of steel heretofore used in making such core steel reinforcements.

It is to be understood that the form of my invention herewith shown and described is to be taken as a preferred example of the same and that various changes may be made in the shape, size and arrangement of parts thereof without departing from the spirit of the invention or the scope of the subjoined claims.

Having thus described my invention, I claim:

1. A core steel reinforcement for window guide channels and the like, said reinforcement comprising a strip of steel having a longitudinally-extending central or median area having spaced elevations or embossments and spaced indentations or depressions alternating with said elevations or embossments, said strip having marginal portions at both sides of said central or median area which marginal portions have uniformly spaced slits which extend from said central or median area to the edges of said strip, the portions of said marginal portions between said slits being formed to provide uniformly and longitudinally-spaced corrugations of inverted substantially V-shaped cross-section, said corrugations being spaced from each other by open spaces therebetween, said elevations or embossments being substantially in alignment with the spaces between said corrugations and the upper surfaces of the elevations or embossments being substantially coplanar with the upper ends of the corrugations, said indentations or depressions being substantially in alignment with the corrugations, and the upper surfaces of the indentations or depressions being substantially parallel with the upper ends of the corrugations.

* * * * *